(12) United States Patent
Van Buuren et al.

(10) Patent No.: US 10,524,434 B2
(45) Date of Patent: Jan. 7, 2020

(54) HYRDOPONICS

(71) Applicant: EDEN GREEN GLOBAL TECHNOLOGIES LIMITED, Dublin (IE)

(72) Inventors: Eugene Van Buuren, Pretoria (ZA); Jacques Van Buuren, Pretoria (ZA); Jan Ehlers, Centurion (ZA)

(73) Assignee: EDEN GREEN GLOBAL TECHNOLOGIES LIMITED, Dublin (IE)

( * ) Notice: Subject to any disclaimer, the term of this patent is extended or adjusted under 35 U.S.C. 154(b) by 7 days.

(21) Appl. No.: 16/028,218

(22) Filed: Jul. 5, 2018

(65) Prior Publication Data
US 2018/0310499 A1     Nov. 1, 2018

Related U.S. Application Data

(63) Continuation of application No. 15/564,885, filed as application No. PCT/IB2016/052043 on Apr. 11, 2016.

(30) Foreign Application Priority Data

Apr. 10, 2015   (ZA) .................................. 2015/02400

(51) Int. Cl.
*A01G 31/06*     (2006.01)
*A01G 9/02*     (2018.01)

(52) U.S. Cl.
CPC ............. *A01G 31/06* (2013.01); *A01G 9/022* (2013.01); *A01G 9/023* (2013.01); *Y02P 60/216* (2015.11)

(58) Field of Classification Search
CPC ........ A01G 31/06; A01G 31/02; A01G 9/022; A01G 9/023
See application file for complete search history.

(56) References Cited

U.S. PATENT DOCUMENTS

| | | | |
|---|---|---|---|
| 3,432,965 A | 3/1969 | Smith et al. |
| 3,483,656 A | 12/1969 | Baumann |
| 3,660,933 A | 5/1972 | Wong, Jr. |
| 4,059,922 A | 11/1977 | DiGiacinto |

(Continued)

FOREIGN PATENT DOCUMENTS

| CN | 104206199 | 12/2014 |
|---|---|---|
| JP | 2639130 | 8/1997 |

(Continued)

OTHER PUBLICATIONS

International Search Report and Written Opinion issued in PCT Application No. PCT/IB2016/052043, dated Sep. 8, 2016.

(Continued)

*Primary Examiner* — Monica L Williams
(74) *Attorney, Agent, or Firm* — Norton Rose Fulbright US LLP

(57) ABSTRACT

The invention relates to a planter forming part of a hydroponic system. The planter includes a longitudinal body defining at least two longitudinally extending liquid channels and at least two plant holders defined in the body, the plant holders spaced on the outer circumference of the longitudinal body, each one of the at least two plant holders in fluid flow communication with one of the at least two longitudinally extending liquid channels.

25 Claims, 7 Drawing Sheets

(56) References Cited

U.S. PATENT DOCUMENTS

| | | | |
|---|---|---|---|
| 4,310,990 A | | 1/1982 | Payne |
| 4,389,813 A | | 6/1983 | Jacques et al. |
| 4,513,533 A | | 4/1985 | Gething et al. |
| 5,276,997 A | | 1/1994 | Swearengin |
| 5,385,590 A | | 1/1995 | Sledge |
| 5,502,923 A | * | 4/1996 | Bradshaw ............... A01G 31/06 47/62 A |
| 5,533,302 A | | 7/1996 | Lynch et al. |
| 5,724,768 A | * | 3/1998 | Ammann, Jr. ......... A01G 31/02 47/59 R |
| 6,065,245 A | | 5/2000 | Seawright |
| 6,389,751 B1 | | 5/2002 | Wang |
| 6,470,625 B1 | | 10/2002 | Byun |
| 6,502,350 B1 | | 1/2003 | Dick |
| 6,840,008 B1 | | 1/2005 | Bullock et al. |
| 7,055,282 B2 | | 6/2006 | Bryan, III |
| 7,069,691 B2 | | 7/2006 | Brooke et al. |
| 9,622,427 B2 | | 4/2017 | Wagner |
| D785,497 S | | 5/2017 | Storey |
| D795,129 S | | 8/2017 | Dillard |
| D796,378 S | | 9/2017 | Storey |
| 2002/0005013 A1 | * | 1/2002 | Taylor ..................... A01G 9/022 47/66.6 |
| 2003/0089037 A1 | | 5/2003 | Ware |
| 2006/0032128 A1 | * | 2/2006 | Bryan, III ............... A01G 31/06 47/62 R |
| 2007/0144069 A1 | | 6/2007 | Gottlieb |
| 2010/0132255 A1 | | 6/2010 | Webber |
| 2010/0146854 A1 | | 6/2010 | Cannon |
| 2011/0067301 A1 | | 3/2011 | DeMitchell et al. |
| 2012/0167460 A1 | | 7/2012 | Omidi |
| 2012/0291349 A1 | * | 11/2012 | Teng ...................... A01G 9/022 47/65.7 |
| 2013/0118074 A1 | | 5/2013 | Fulbrook |
| 2014/0083007 A1 | | 3/2014 | Galvin |
| 2015/0000189 A1 | * | 1/2015 | Greis-Avnon ........... A01G 9/02 47/66.5 |
| 2015/0223418 A1 | | 8/2015 | Collins et al. |
| 2016/0050863 A1 | | 2/2016 | Graber |
| 2017/0202161 A1 | * | 7/2017 | Eckert .................... A01G 27/06 |
| 2017/0339854 A1 | | 11/2017 | Van der Merwe |
| 2017/0347545 A1 | | 12/2017 | Van der Merwe |
| 2018/0001447 A1 | | 1/2018 | Lam et al. |

FOREIGN PATENT DOCUMENTS

| | | |
|---|---|---|
| JP | 2004-154084 | 6/2004 |
| TW | 492607 | 1/2015 |

OTHER PUBLICATIONS

International Preliminary Report on Patentability issued in PCT Application No. PCT/IB2016/052043, dated Oct. 10, 2017.

Search Report and Written Opinion issued in Singapore Application No. 11201708315S, dated Aug. 24, 2018.

* cited by examiner

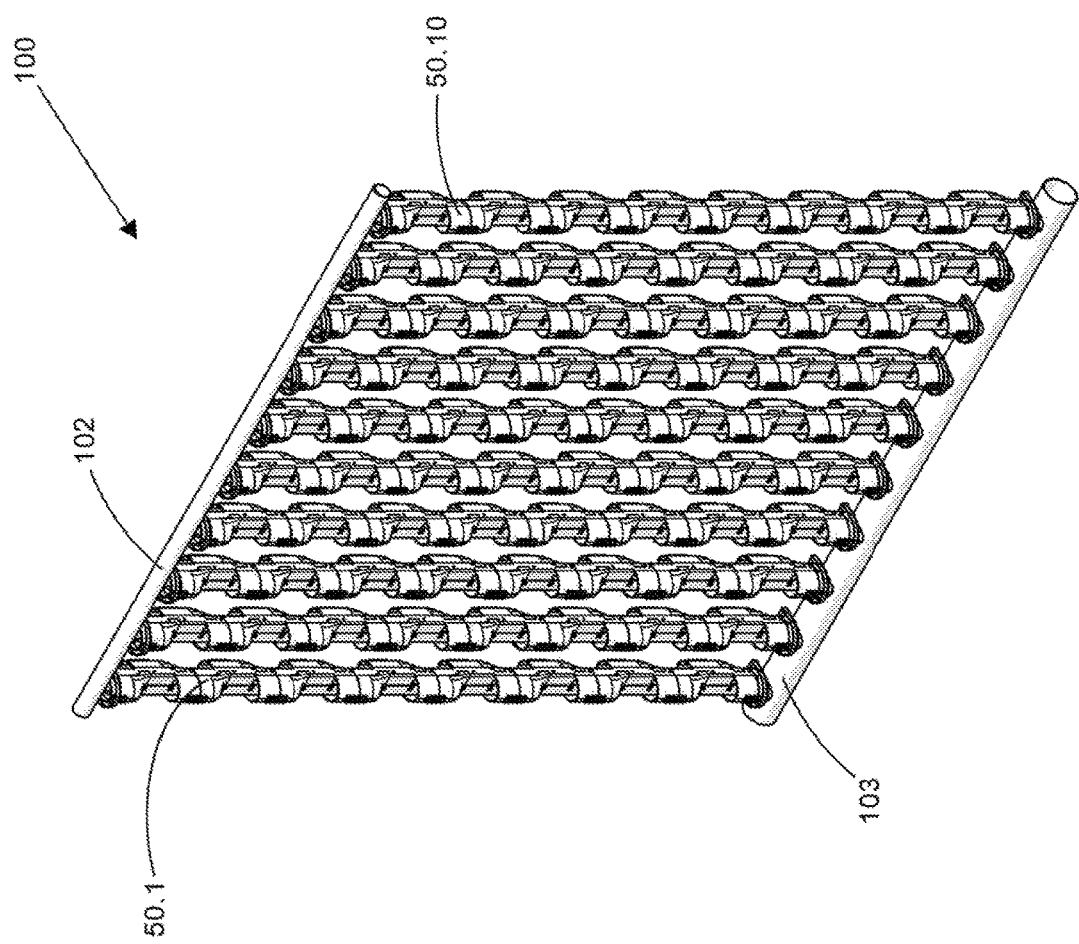

HYRDOPONICS

CROSS-REFERENCE TO RELATED APPLICATIONS

The present application claims priority from and is a Continuation of U.S. patent application Ser. No. 15/564,885 entitled "HYDROPONICS," filed on Oct. 6, 2017, which claims priority from and is a U.S. National Stage filing under 35 U.S.C. § 371 of International Application No. PCT/IB2016/052043 entitled "HYDROPONICS," filed on Apr. 11, 2016, which claims the benefit of South African Provisional Patent Application No. 2015/02400 entitled "HYDROPONICS," filed Apr. 10, 2015, the contents of each of which are incorporated by reference herein in their entirety.

FIELD OF INVENTION

This invention relates to hydroponics. In particular the invention relates to a planter, a planter tower and a hydroponic greenhouse

BACKGROUND OF THE INVENTION

The inventors are aware of hydroponic systems and arrangements. In particular, the inventors filed an earlier South African Patent application number 2014/02082.

Existing planters are prone to plants growing into each other and getting attached to each other in the planter, which make the harvesting of plants from the planter cumbersome.

Furthermore, the present invention has the object of improving planting density without compromising growth.

SUMMARY OF THE INVENTION

According to one aspect of the invention, there is provided a planter which includes a longitudinal body defining at least two longitudinally extending liquid channels; and at least two plant holders defined in the body, the plant holders spaced on the outer circumference of the longitudinal body, each one of the at least two plant holders in fluid flow communication with one of the at least two longitudinally extending liquid channels.

The longitudinal body may include a single longitudinal conduit which is internally divided to define the at least two longitudinally extending liquid channels.

Each planter holder may define a holder mouth into which plants are receivable. In particular the holder mouth may be shaped as an applanated cylindrical ellipse, -circle or the like.

In one embodiment, the at least two plant holders may be located on opposed sides of the longitudinal body. In particular, the at least two plant holders may be alternatively spaced on opposed sides over the length of the longitudinal body.

Each of the plant holders may be in fluid flow communication with a different one of the longitudinally extending liquid channels.

The longitudinal body may include connecting formations at the ends of the longitudinal body.

The connecting formations may be shaped and dimensioned to fit into corresponding connection formations of corresponding planters.

The operative lower end of the longitudinal body of the planter may have a connection formation for fitting into a corresponding connection formation on an operative upper end of a longitudinal body of a corresponding planter installed below the former planter, and the operative upper end of the longitudinal body of the planter may have a connection formation for fitting into a corresponding connection formation on an operative lower end of a longitudinal body of a corresponding planter installed above the former planter.

In one embodiment the connecting formations may be in the form of socket and spigot formations shaped and dimensioned to fit into respective spigot and socket formations of corresponding planters.

The operative lower end of the longitudinal body of the planter may have a spigot formation, for fitting into a socket formation on an operative upper end of a longitudinal body of a corresponding planter installed below the former planter and the operative upper end of the longitudinal body of the planter may have a socket formation for receiving a spigot formation on an operative lower end of a longitudinal body of a corresponding planter installed above the former planter.

In an opposed example, the operative lower end of the longitudinal body of the planter may have socket formation, for receiving a spigot formation on an operative upper end of a longitudinal body of a corresponding planter installed below the former planter and the operative upper end of the longitudinal body of the planter may have a spigot formation for fitting into a socket formation on an operative lower end of a longitudinal body of a corresponding planter installed above the former planter.

Each plant holder may include an inlet opening and an outlet opening, which is in flow communication with its corresponding liquid channel. In particular the inlet opening may be located above the outlet opening to permit gravitational liquid flow into the plant holder through the inlet opening and liquid flow from the plant holder through the outlet opening.

The planter may include at least one longitudinally extending gas channel, the gas channel having gas outlets spaced along its length. The gas outlets may open to the outside of the planter body. The gas outlets may be in the form of nozzles.

The connecting formations may be shaped and dimensioned to connect adjacent planter bodies together. The connecting formations may include liquid channel connecting formations for connecting the liquid channels of adjacent planter bodies together. The connecting formations may include gas channel connecting formations for connecting the gas channels of adjacent planter bodies together.

The planter may include an external attachment formation proximate the plant holder mouth for attaching plant supports. In particular, the attachment formation may be located below the plant holder mouth and may receive various types of plant supports, such as a creeper trellis and the like. In this embodiment, the creeper trellis may be arranged to support a creeper plant, planted in the plant holder when it grows from the plant holder mouth.

The external attachment formation may further be supportive of lighting means, proximate the plant leaves for enhancing lighting onto the plant and subsequent plant growth. The lighting means may be in the form of light emitting diodes (LED's) operable to emit a specific frequency of light.

The planter may further include planting inserts shaped and dimensioned to fit into mouths of the at least two plant holders.

The planting inserts may be selected from any one or more of: a seedling tray, a planting tray, a seeding clip and the like.

The seedling tray may be in the form of a cylindrical body, shaped to the shape of the plant holder. The seedling tray may have a depth of about 43 mm. The seedling tray may include an inlet opening indexed with the inlet opening of the plant holder. The seedling tray may include a planar base cut in sections to provide drainage slits. The drainage slits may be less than 0.5 mm in width to permit liquid drainage without flushing seedlings from the seedling tray.

The planting tray may be in the form of a cylindrical body shaped to the shape of the plant holder. The planting tray may have a depth of about 117 mm. The planting tray may include an inlet opening indexed with the inlet opening of the plant holder. The planting tray may include a planar base cut in sections to provide drainage slits. A portion of the planting tray sidewall may also include drainage slits. The portion of the sidewall may be slightly tapered towards the base. The drainage slits may be less than 0.5 mm in width to permit liquid drainage without flushing seedlings from the seedling tray.

The seeding clip may have a planar body for closing the planter mouth and provided with a downwardly projecting plate having a slot shaped to engage the stem of a plant.

According to another aspect of the invention, there is provided a planter tower, which includes a plurality of planters as described, connected together to form an elongate upright planter with plant holders extending from the sides of the planter tower.

The planter tower may include between eight and sixteen planters connected together.

The planter tower may include at least one end member, shaped and dimensioned to connect onto an end the plurality of planters connected together.

Specifically the planter tower may include two end members, a top end member for connecting to the top end of the plurality of planters and a bottom end member for connecting to the bottom end of the plurality of planters.

The at least one end member may be shaped to fit onto an end of a longitudinal body of a planter, socket and spigot fashion.

The at least one end member may include dual liquid conduits indexed to match the longitudinally extending liquid channels.

The at least one end member may include a gas conduit indexed to match a gas channel extending through the planters.

The at least one end member may include a body with two sides, one of which is provided with a socket formation and one of which is provided with a spigot formation for fitting onto matched spigot and socket formations of the ends of the longitudinal body.

The top end member may be in the form of an intake closure attached at a top end of a plurality of inter-connected planters for directing liquid into the two longitudinally extending liquid channels and for directing gas into the at least one longitudinally extending gas channel.

The bottom end member may be in the form of an outlet closure attached at a bottom end of a plurality of inter-connected planters for directing liquid from the two longitudinally extending liquid channels and for directing gas from the at least one longitudinally extending gas channel.

The at least one end member may include a catchment tray, for receiving any overflow liquid.

The liquid channels may extend over the length of the interconnected planters.

Each planter in the planter tower may include a gas channel, the gas channel extends over the length of the inter-connected planters.

According to another aspect of the invention, there is provided a hydroponic greenhouse, which includes an array of planter towers, the planter towers arranged in parallel spaced rows, the rows being provided with a top liquid and gas supply line, connected via an intake closure to a top of each of the planter towers, the rows further being provided with a bottom liquid and gas collection line, connected via an outlet closure to a bottom of each of the planter towers; a liquid circulation system, connected to the liquid supply lines and the liquid collection lines; a gas circulation system, connected to the gas supply lines and the gas collection lines.

In an embodiment where the gas outlets, described above, are directed to the outsides of the planter bodies, the gas outlets may be directed at plants in an adjacent planter tower, advantageously to provide an adequate exchange of gas on the leaves of an adjacent plant.

The greenhouse may include a partially closed enclosure, which may be provided with any one or more of air conditioners, high pressure fans, dampers, coiled coolers for recirculation of the liquid or gas from the liquid collection lines to the liquid supply lines or alternatively gas supply lines, geothermal heater/coolers, heat pumps, humidity controllers, infra-red controllers, and the like.

The greenhouse may be provided with a nutrient supply dosing pump connected to the liquid circulation system for dosing nutrients into the liquid circulation system.

The greenhouse may further include a filtering arrangement connected to the liquid circulation system for filtering the liquid in the liquid circulation system.

The invention will now be described by way of a non-limiting example only, with reference to the following drawing.

DRAWINGS

In the drawings:

FIG. 9 shows a hydroponic greenhouse in accordance with a further aspect of the invention.

EMBODIMENT OF THE INVENTION

Figure 1B:
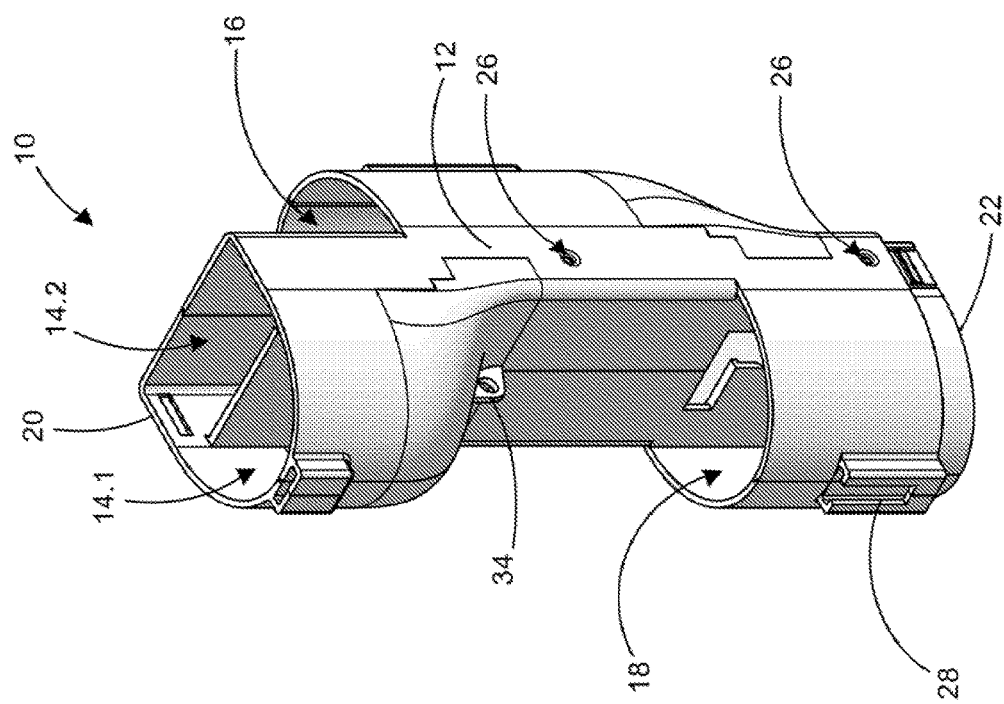
FIGS. 1a and 1b show three-dimensional views of a planter in accordance with one aspect of the invention.
Figure 1A:
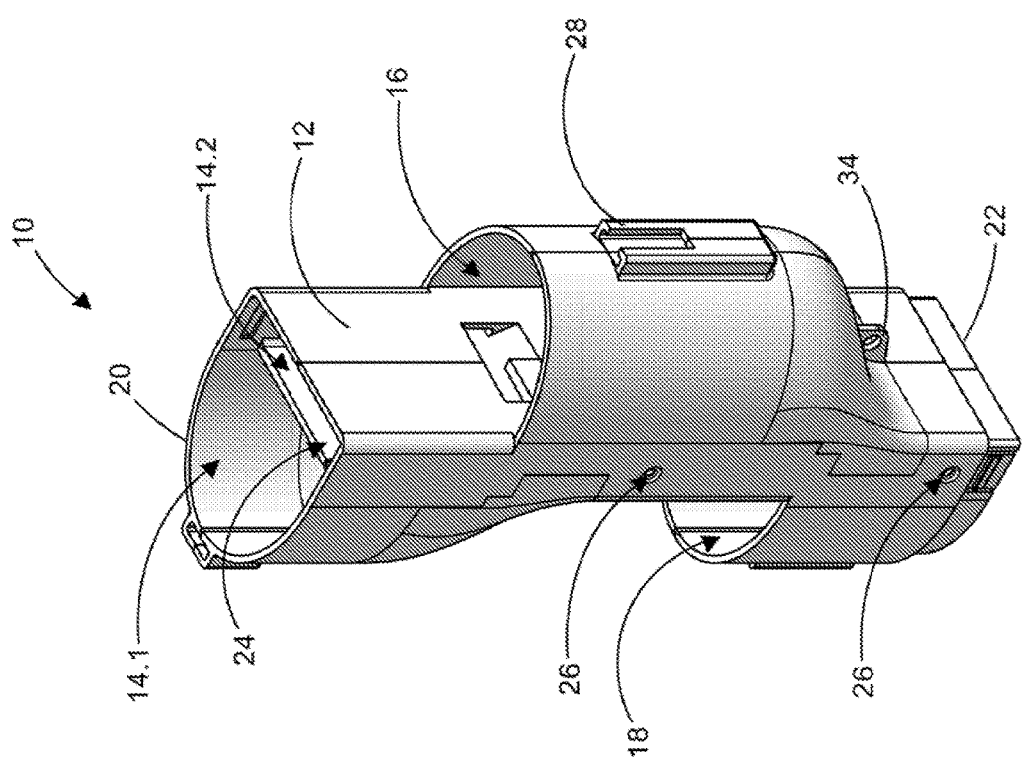
Figures 2A, 2B:
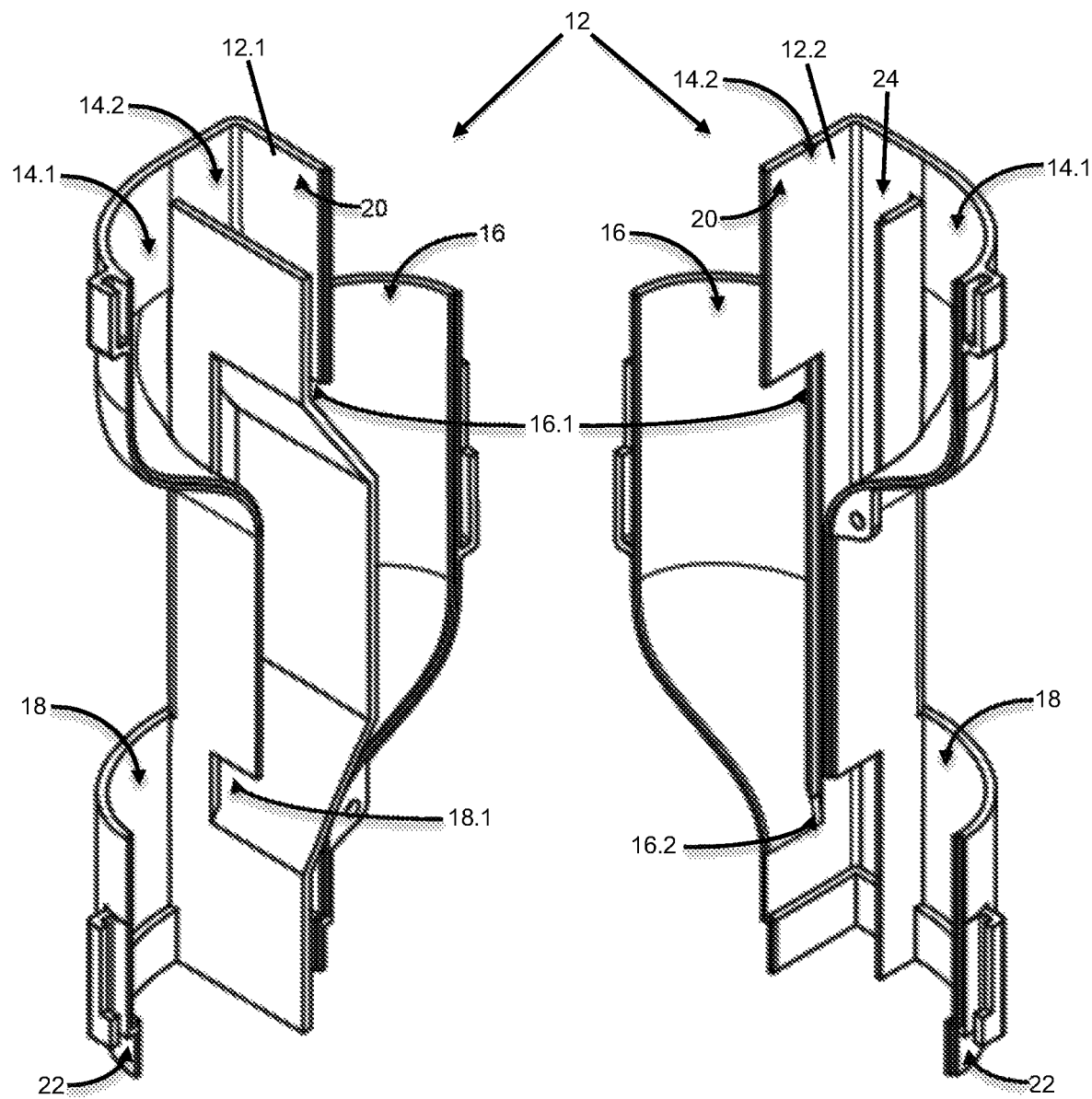
FIGS. 2a and 2b show two halves of the planter of FIG. 1.

In FIG. 1 a planter 10, in accordance with one aspect of the invention, is shown. The planter 10 has a longitudinal body 12, in two halves 12.1 and 12.2, as best shown in FIGS. 2a and 2b.

The longitudinal body 12 defines two longitudinally extending liquid channels 14.1 and 14.2 as shown in FIGS. 1 and 2.

The planter 10 includes two plant holders 16, 18 defined on the outer circumference of the longitudinal body. As can be seen in FIG. 2, the two plant holders 16, 18 have openings

16.1, 18.1 defining liquid inlets to the plant holders and 16.2, 18.2 defining liquid outlets from the plant holders.

As can be seen in FIGS. 1 and 2, the plant holders 16, 18 have holder mouths in the form of applanated cylindrical ellipses.

As can be seen in FIGS. 1 and 2, the two plant holders 16, 18 are alternatively spaced on opposed sides of the longitudinal body.

Figure 3:
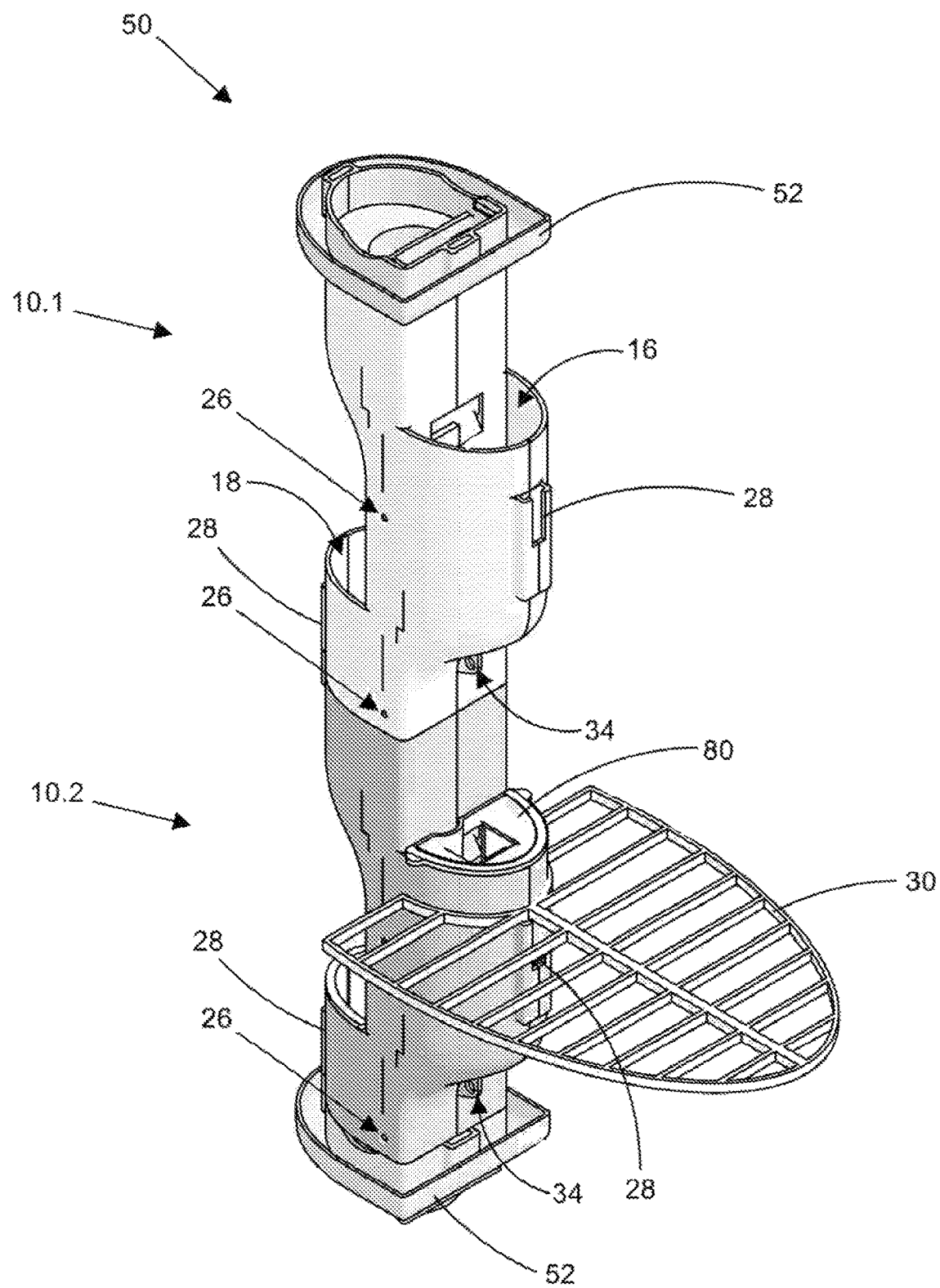
FIG. 3 shows a planter tower comprising assembled planters of FIG. 1.

In FIGS. 1 and 2, it can be seen that the longitudinal body has connecting formations 20, 22 in the form of socket and spigot formations at the ends of the longitudinal body 12. As can be seen in FIG. 3, the connecting formations are shaped and dimensioned to fit into respective spigot and socket formations of corresponding planters.

Importantly the operative lower end of the longitudinal body 12 of the planter 10 has a spigot formation 22, for fitting into a socket formation 20 on an operative upper end of a longitudinal body 12 of a corresponding planter 10 installed below the former planter.

As can be seen in FIG. 2, each plant holder 16, 18 has an inlet opening 16.1, 18.1 and an outlet opening 16.2, 18.2, respectively, which forms part of its corresponding liquid channel 14.2 and 14.1, respectively. As can be seen, the inlet openings 16.1, 18.1 are located above the outlet openings 16.2, 18.2 to permit liquid to flow into the plant holders 16, 18 through the inlet openings 16.1, 18.1 and from the plant holder through the outlet opening 16.2, 18.2.

As can be seen in FIG. 2, each plant holder 18 comprises two halves, which defines a complete plant holder, when connected to each other.

The planter 10 further includes a longitudinally extending gas channel 24. The gas channel 24 has outlets spaced along its length. In particular, the gas channel 24 has outlets 26 that open to the outside of the planter body 12 (see FIG. 3). The gas outlets 26 are in the form of nozzles, when the planters are assembled in an array as shown in FIG. 9, the nozzles are directed at plants in adjacent planter towers, to ensure adequate gas exchange on the leaves of those plants.

Figure 7:
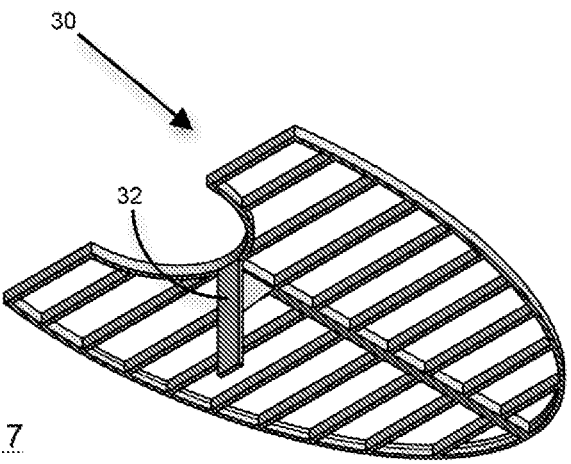
FIG. 7 shows a creeper trellis of a planter.

As can be seen in FIG. 1, the planter has an external attachment formation 28 proximate the plant holder mouth for attaching plant supports. One example of such a plant support is a plant trellis 30, shown in FIG. 7, which has a corresponding attachment formation 32, which can fit into the attachment formation 28, spigot and socket fashion. The creeper trellis 30 is arranged to support a creeper plant (not shown), planted in the plant holder when it grows from the plant holder mouth 16, 18.

The planter 10 also has external attachment formations in the form of apertures 34, for holding wire, line or cables that can provide additional structural strength to the planter assembly 50 or to provide a structure onto which creepers can grow.

Figure 5:
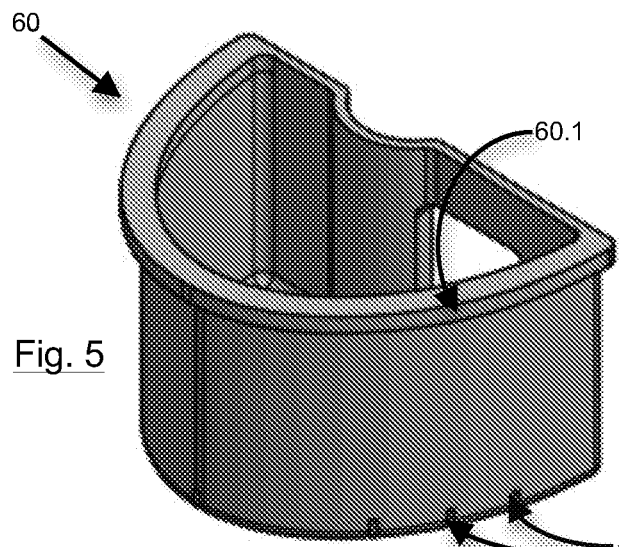
FIG. 5 shows a seedling tray of a planter.
Figure 6:
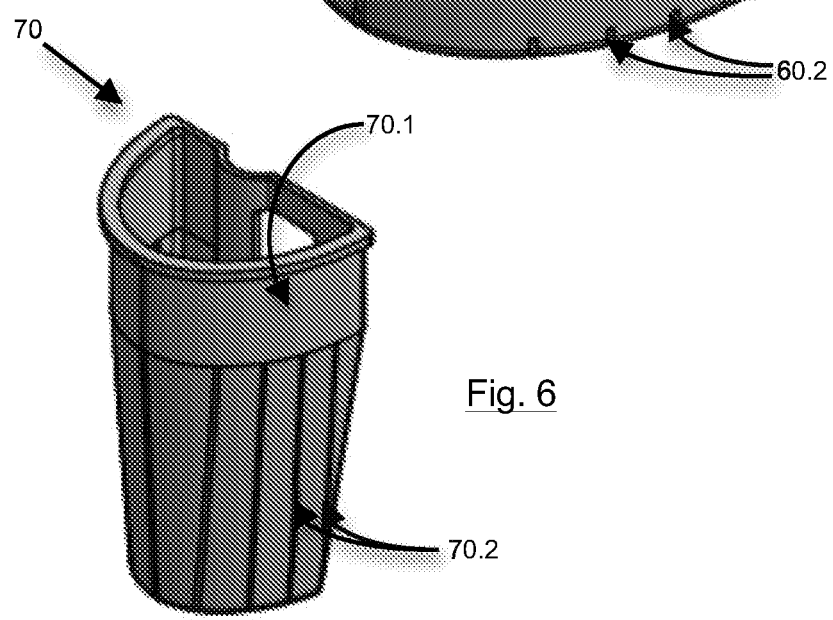
FIG. 6 shows a planting tray of a planter.
Figure 8:
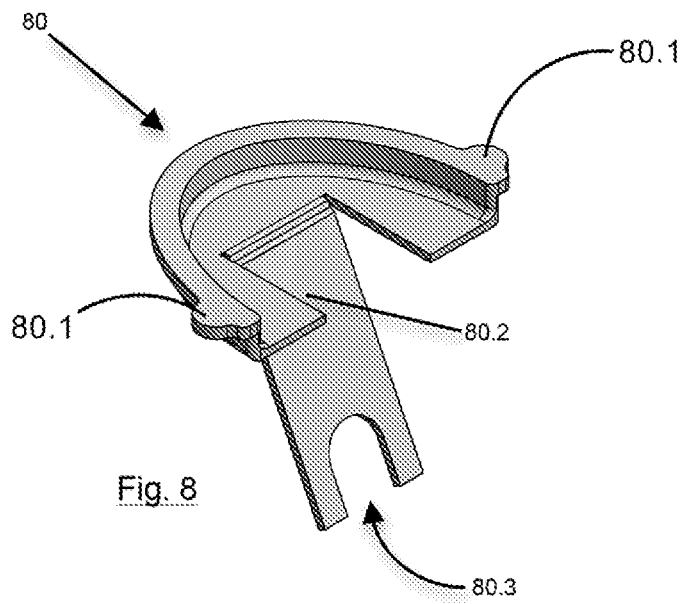
FIG. 8 shows a seeding clip of a planter arrangement.

Each planter 10 also includes planting inserts (as shown in FIGS. 5, 6 and 8) shaped and dimensioned to fit onto mouths of the plant holders 16, 18. The planting inserts are selected from: a seedling tray, a planting tray and a seeding clip. The planting inserts may be selected based on its suitability for a specific plant.

In FIG. 5 a seedling tray 60 is shown, which is shaped and dimensioned to fit into a mouth of a plant holder 16, 18. The seedling tray 60 has a depth of about 43 mm. The seedling tray 60 has an inlet opening 60.1 indexed with the inlet openings 16.1, 18.1 of the plant holder. The seedling tray 60 has a planar base cut in sections to provide drainage slits 60.2. The drainage slits 60.2 are less than 0.5 mm in width to permit liquid drainage without flushing seedlings from the seedling tray 60.

In FIG. 6 a planting tray 70 is shown, which is shaped and dimensioned to fit into a mouth of a plant holder 16, 18. The planting tray 70 has a depth of about 117 mm and is in the form of a cylindrical body shaped to the shape of the plant holder 16, 18. The planting tray 70 includes an inlet opening 70.1 indexed with the inlet openings of the plant holder 16.1, 18.1. The planting tray 70 has a planar base cut in sections to provide drainage slits. A portion of the planting tray sidewall also has drainage slits 70.2. The portion of the sidewall is slightly tapered towards the base. The drainage slits is less than 0.5 mm in width to permit liquid drainage without flushing seedlings from the seedling tray 70.

In FIG. 8 a seeding clip 80 is shown. The seeding clip 80 is shaped to fit onto the mouth of a plant holder 16, 18. The seeding clip 80 has a planar body for closing the planter mouth and is provided with a downwardly projecting plate 80.2 and a slot 80.3 shaped to engage the stem of a plant. The seeding clip 80 further includes finger projections 80.1, which can be compressed towards each other for removing the seeding clip 8 from the mouth of the plant holder 16, 18.

FIG. 3 shows a planter tower 50 in accordance with a further aspect of the invention. In this example the planter tower 50 includes two planters 10.1, 10.2 as described, connected together to form an elongate upright planter, with plant holders 16, 18 extending from the sides of the planter tower 50 (It is to be appreciated that in a preferred embodiment a planter tower would include about eight planters connected together as shown in FIG. 9).

Figure 4A:
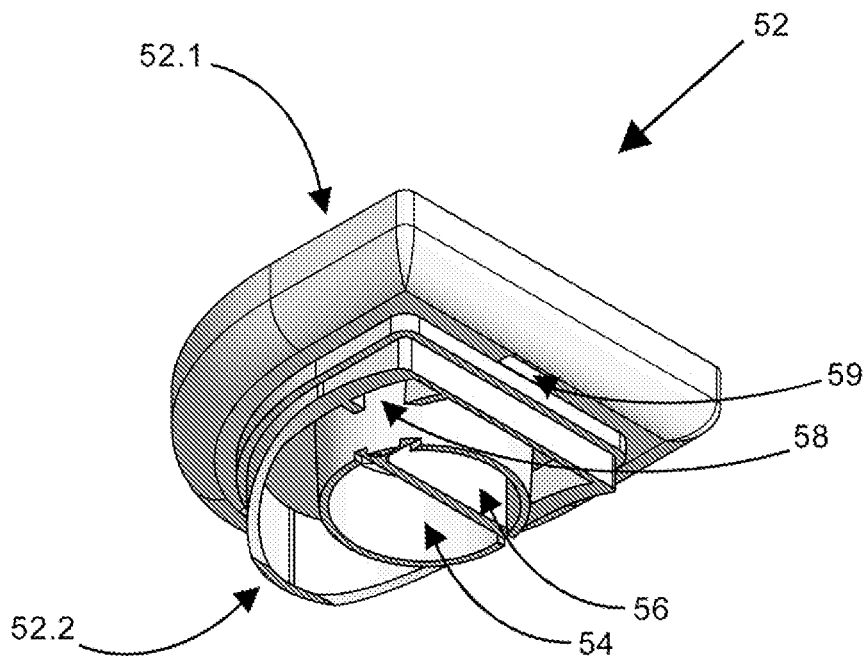
FIGS. 4a and 4b show three-dimensional views of an end member of a planter arrangement.
Figure 4B:
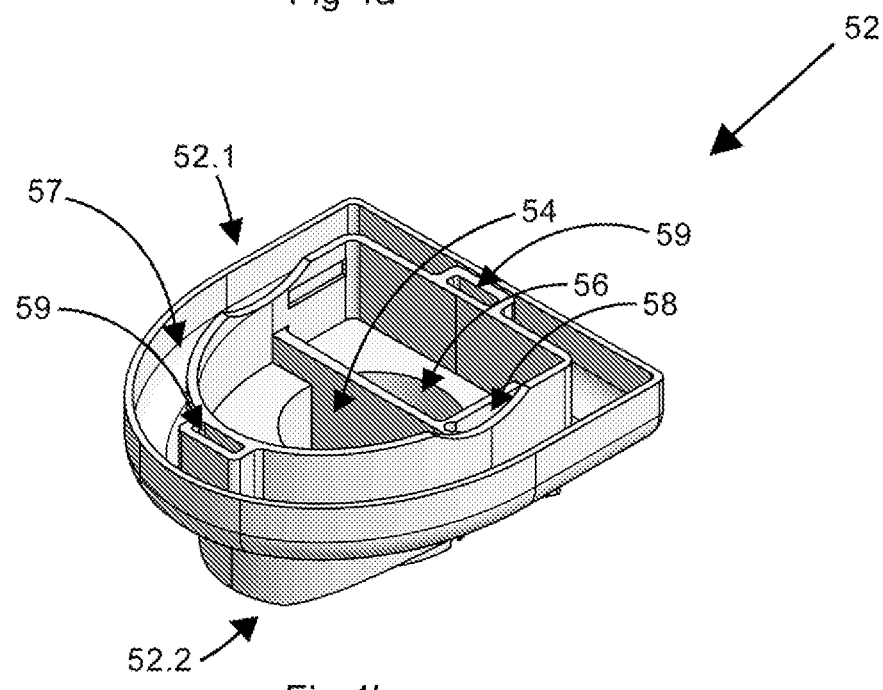

The planter tower 50 is provided with two end members 52, as best shown in FIG. 4, (not mounted in FIG. 4) shaped to fit socket and spigot fashion onto a top or bottom end of a longitudinal body 12 of a planter 10.

The end members 52 have dual liquid conduits 54, 56 indexed to match the longitudinally extending liquid channels 14.2, 14.1. The end members 52 also each has a gas conduit 58 indexed to match the gas channel 24 extending through the planters.

The end members 52 each has a body with two sides, an upper side which is provided with a socket formation 52.1 and a bottom side which is provided with a spigot formation 52.2 for fitting onto matched spigot-22 and socket-20 formations on the ends of the longitudinal body 12 of the planters 10. The upper and bottom sides further includes a recessed cradle formation for receiving a top liquid and gas supply line (as shown in FIG. 9) and a bottom liquid and gas collection line across the end members. In this example the upper cradle formation is dimensioned to fit a 50 mm to 65 mm pipe and the bottom cradle formation is dimensioned to fit a 110 mm to 160 mm pipe.

In this example the planter tower 50 includes a top end member 52 for connecting to the top end of the plurality of planters 10.1, 10.2 and a bottom end member 52 for connecting to the bottom end of the plurality of planters 10.1, 10.2. The top end member 52 and bottom end member 52 are identical in shape and dimension, but function as an intake closure 52 and outlet closure 52 respectively.

The intake closure 52 attached at a top end of a plurality of interconnected planters, being operable to direct liquid into the two longitudinally extending liquid channels 14.1, 14.2 and for directing gas into the longitudinally extending gas channel 24.

The outlet closure 52 attached at a bottom end of a plurality of interconnected planters, being operable to direct liquid out from the two longitudinally extending liquid channels 14.1, 14.2.

The liquid channels 14.1, 14.2 and gas channel 24 extend over the length of the inter-connected planters 10.

The bottom side of the end members 52 also includes a catchment tray 57 on the outer perimeter of the end members. When the end member 52 is used as a bottom end member, the catchment tray 57 is operable to receive overflow liquid from the planter tower 50.

As can be seen in FIG. 3, the plant holders 16, 18 which are alternatively spaced on opposed sides over the length of the of the planter tower 50, provide for maximum space and access to sunlight for the plants. Furthermore, with the roots growing downwardly, possibly into the liquid channels 14.1, 14.2, maximum provision is made for root growth, without interference from plants directly below or above any planter.

FIG. 9 shows a hydroponic greenhouse 100 in accordance with yet a further aspect of the invention. The hydroponic greenhouse 100 includes an array of planter towers as described. In this figure only one row of planter towers 50.1 to 50.10 are shown (for illustrative purposes), however in practice the hydroponic greenhouse includes a plurality of parallel spaced planter tower rows.

The rows being provided with a top liquid and gas supply line 102, connected via an intake closure 52 to a top of each of the planter towers 50. The rows are further provided with a bottom liquid and gas collection line 103, connected via an outlet closure 52 to a bottom of each of the planter towers 50.

The hydroponic greenhouse 100 includes a liquid circulation system (not shown), connected to the liquid supply lines 102 and the liquid collection lines 103 and a gas circulation system (not shown), connected to the gas supply lines 102 and the gas collection lines 103.

In this example the top liquid and gas supply line 102 includes a 50 mm to 65 mm diameter plastic outer pipe, onto which the top end members 52 of each planter tower 50 in the row is attached. The 50 mm to 65 mm diameter plastic outer pipe includes interspaced apertures through which liquid and gas is fed into the planter towers 50. The top end members (inlet closures) 52 are secured to the pipe via connectors. In this example the connectors are in the form of cable ties (not shown), which are threaded through connector apertures 59 on the end members 52.

In this example the bottom liquid and gas collection line 103 includes a 110 mm to 160 mm diameter plastic outer pipe, onto which the bottom end members (outlet closures) 52 of each planter tower 50 in the row is attached. The 110 mm to 160 mm diameter plastic outer pipe includes interspaced apertures through which liquid and gas is received from the planter towers 50. The bottom end members 52 are secured to the pipe via connectors. In this example the connectors are in the form of cable ties (not shown), which are threaded through connector apertures 59 on the end members 52.

The hydroponic greenhouse includes a partially closed enclosure (not shown), which is provided with any one or more of: air conditioners, high pressure fans, dampers, coiled coolers for recirculation of the liquid or gas from the liquid collection lines to the liquid supply lines or alternatively gas supply lines, geothermal heater/coolers, heat pumps, humidity controllers and infra-red controllers.

The hydroponic greenhouse is also provided with a nutrient supply dosing pump (not shown) connected to the liquid circulation system for dosing nutrients into the liquid circulation system.

The hydroponic greenhouse is further provided with a filtering arrangement (not shown) connected to the liquid circulation system for filtering the liquid in the liquid circulation system.

The inventors are of the opinion that the invention as described provides a new planter, a planter tower and a hydroponic greenhouse.

The invention claimed is:

1. A planter comprising:
   a longitudinal body defining at least two longitudinally extending liquid channels, the two longitudinally extending liquid channels comprising:
   a first longitudinally extending liquid channel having a first channel inlet opening and a first channel outlet opening, wherein a first flow path of the first longitudinally extending liquid channel extends from the first channel inlet opening to the first channel outlet opening; and
   a second longitudinally extending liquid channel that is distinct from the first longitudinally extending liquid channel; and
   at least two plant holders defined in the body, the plant holders spaced on the outer circumference of the longitudinal body, each one of the at least two plant holders in fluid flow communication with a corresponding single one of the at least two longitudinally extending liquid channels,
   in which a first plant holder of the at least two plant holders is in fluid flow communication with the first longitudinally extending liquid channel and includes an inlet opening or an outlet opening, the inlet opening or the outlet opening positioned between the first channel inlet opening and the first channel outlet opening and is included in the first flow path between the first channel inlet opening and the first channel outlet opening, and
   in which a second plant holder of the at least two plant holders is in fluid flow communication with the second longitudinally extending liquid channel.

2. The planter of claim 1, in which the longitudinal body includes a longitudinal conduit which is internally divided to define the at least two longitudinally extending liquid channels.

3. The planter of claim 1, in which the at least two plant holders are located on opposed sides of the longitudinal body, wherein each of the at least two longitudinally extending liquid channels extends from an upper end of the longitudinal body.

4. The planter of claim 1, in which each plant holder includes an inlet opening and an outlet opening, which is in flow communication with its corresponding longitudinally extending liquid channel, and in which the inlet opening is located above the outlet opening to enable gravitational liquid flow into the plant holder through the inlet opening and liquid flow from the plant holder through the outlet opening.

5. The planter of claim 1, in which the at least two plant holders are alternatively spaced on opposed sides over the length of the longitudinal body, and in which the at least two plant holders defined in the body are integrally formed with the body, and each of the plant holders defined in the body are integrally formed with the body.

6. The planter of claim 1, in which:
   the first plant holder has the inlet opening, the outlet opening, and a corresponding mouth that is distinct from the inlet opening and the outlet opening, and
   the longitudinal body includes connecting formations at the ends of the longitudinal body, the connecting formations are shaped and dimensioned to fit into corresponding connection formations of corresponding planters, and the connecting formations include:

liquid channel connecting formations for connecting the liquid channels of adjacent planter bodies together; or gas channel connecting formations for connecting the gas channels of adjacent planter bodies together.

7. The planter of claim 1, in which the planter includes at least one longitudinally extending gas channel, the gas channel having gas outlets spaced along its length, and in which the planter is configured to be coupled a plurality of planters connected together to form a plant tower having interconnected liquid channels, the plant tower included in an array of plant towers included in a hydroponic greenhouse, the array of planter towers arranged in parallel spaced rows, the rows being provided with a top liquid and gas supply line, connected via an intake closure to a top of each of the planter towers, the rows further being provided with a bottom liquid and gas collection line, connected via an outlet closure to a bottom of each of the planter towers, the liquid supply lines and the liquid collection lines connected to a liquid circulation system of the greenhouse, and the gas supply lines and the gas collection lines connected to a gas circulation system of the greenhouse.

8. The planter of claim 1, in which each plant holder has a corresponding mouth, and in which the planter includes an external attachment formation associated with each plant holder for attaching a plant support, the attachment formation is located below the plant holder mouth, and the plant support is in the form of a creeper trellis arranged to support a creeper plant, planted in the plant holder when it grows from the plant holder mouth.

9. The planter of claim 1, in which the planter includes planting inserts shaped and dimensioned to fit into mouths of the at least two plant holders, and in which the planting inserts are selected from any one or more of: a seedling tray, a planting tray and a seeding clip.

10. The planter of claim 9, in which each plant holder includes an inlet opening, and in which the seedling tray is in the form of a cylindrical body, shaped to the shape of the plant holder and includes an inlet opening indexed with the inlet opening of the plant holder, the seedling tray includes a planar base cut in sections to provide drainage slits to permit liquid drainage without flushing seedlings from the seedling tray.

11. The planter of claim 9, in which each plant holder includes an inlet opening, and in which the planting tray is in the form of a cylindrical body shaped to the shape of the plant holder and includes an inlet opening indexed with the inlet opening of the plant holder, the planting tray includes a planar base cut in sections to provide drainage slits to permit liquid drainage without flushing seedlings from the seedling tray.

12. The planter of claim 9, in which the seeding clip has a planar body for closing the plant holder mouth and provided with a downwardly projecting plate having a slot shaped to engage the stem of a plant.

13. A planter tower comprising:
a plurality of planters connected together to form an elongate upright planter with plant holders extending from the sides of the planter tower, at least one planter of the plurality of planters comprising:
a longitudinal body defining at least a portion of two longitudinally extending liquid channels, the two longitudinally extending liquid channels comprising:
a first longitudinally extending liquid channel; and
a second longitudinally extending liquid channel that is distinct from the first longitudinally extending liquid channel; and at least two plant holders defined in the body, the plant holders spaced on the outer circumference of the longitudinal body, each one of the at least two plant holders in fluid flow communication with a corresponding single one of the at least two longitudinally extending liquid channels,
in which a first plant holder of the at least two plant holders is in fluid flow communication with the first longitudinally extending liquid channel, and
in which a second plant holder of the at least two plant holders is in fluid flow communication with the second longitudinally extending liquid channel;
a top end member for connecting to the top end of the plurality of planters connected together; and
a bottom end member for connecting to the bottom end of the plurality of planters connected together.

14. The planter tower of claim 13, in which:
the top end of the plurality of planters defines a first channel inlet opening of the first longitudinally extending liquid channel,
the bottom end of the plurality of planters defines a first channel outlet opening of the first longitudinally extending liquid channel,
a first flow path of the first longitudinally extending liquid channel extends from the first channel inlet opening to the first channel outlet opening, and
the first plant holder includes an inlet opening or an outlet opening, the inlet opening or the outlet opening positioned between the first channel inlet opening and the first channel outlet opening and is included in the first flow path between the first channel inlet opening and the first channel outlet opening.

15. The planter tower of claim 13, in which the plant tower is configured to be included in an array of plant towers included in a hydroponic greenhouse, the array of planter towers arranged in parallel spaced rows, the rows being provided with a top liquid and gas supply line, connected via an intake closure to a top of each of the planter towers, the rows further being provided with a bottom liquid and gas collection line, connected via an outlet closure to a bottom of each of the planter towers, the liquid supply lines and the liquid collection lines connected to a liquid circulation system of the greenhouse, and the gas supply lines and the gas collection lines connected to a gas circulation system of the greenhouse.

16. The planter tower of claim 15, in which:
the top end member is in the form of an intake closure attached at a top end of a plurality of inter-connected planters for directing liquid into the two longitudinally extending liquid channels and for directing gas into the at least one longitudinally extending gas channel; or
the bottom end member is in the form of an outlet closure attached at a bottom end of a plurality of inter-connected planters for directing liquid from the two longitudinally extending liquid channels and for directing gas from the at least one longitudinally extending gas channel.

17. A hydroponic greenhouse comprising:
an array of planter towers arranged in parallel spaced rows, the rows being provided with a top liquid and gas supply line, connected via an intake closure to a top of each of the planter towers, the rows further being provided with a bottom liquid and gas collection line, connected via an outlet closure to a bottom of each of the planter towers, at least one of the plant towers including a planter comprising:

a longitudinal body defining at least a portion of two longitudinally extending liquid channels; and at least two plant holders defined in the body, the plant holders spaced on the outer circumference of the longitudinal body, each one of the at least two plant holders in fluid flow communication with one of the at least two longitudinally extending liquid channels, in which a first plant holder of the at least two plant holders is in fluid flow communication with a first longitudinally extending liquid channel of the at least two longitudinally extending liquid channels, and in which a second plant holder of the at least two plant holders is in fluid flow communication with a second longitudinally extending liquid channel of the at least two longitudinally extending liquid channels;

a liquid circulation system, connected to the liquid supply lines and the liquid collection lines; and a gas circulation system, connected to the gas supply lines and the gas collection lines.

18. The hydroponic greenhouse of claim 17, in which gas outlets of the planters, are directed to the outsides of the planter bodies, the gas outlets being directed at plants in an adjacent planter tower.

19. The hydroponic greenhouse of claim 17, in which:

the greenhouse includes a partially closed enclosure, which is provided with any one or more of: air conditioners, high pressure fans, dampers, coiled coolers for recirculation of the liquid or gas from the liquid collection lines to the liquid supply lines or alternatively gas supply lines, geothermal heater/coolers, heat pumps, humidity controllers and infra-red controllers; or the greenhouse is provided with a nutrient supply dosing pump connected to the liquid circulation system for dosing nutrients into the liquid circulation system or is provided with a filtering arrangement connected to the liquid circulation system for filtering the liquid in the liquid circulation system.

20. A planter comprising:

a longitudinal body defining at least two longitudinally extending liquid channels, the two longitudinally extending liquid channels comprising:

a first longitudinally extending liquid channel; and a second longitudinally extending liquid channel that is distinct from the first longitudinally extending liquid channel;

at least two plant holders defined in the body, the at least two plant holders spaced on the outer circumference of the longitudinal body, each one of the at least two plant holders in fluid flow communication with a corresponding single one of the at least two longitudinally extending liquid channels, in which at least one plant holder has a corresponding mouth; and an external attachment formation associated with the at least one plant holder for attaching a plant support; and in which a first plant holder of the at least two plant holders is in fluid flow communication with the first longitudinally extending liquid channel, and in which a second plant holder of the at least two plant holders is in fluid flow communication with the second longitudinally extending liquid channel.

21. The planter of claim 20, in which the attachment formation is located below the plant holder mouth.

22. The planter of claim 20, in which the plant support is in the form of a creeper trellis arranged to support a creeper plant, planted in the plant holder when it grows from the plant holder mouth.

23. A planter comprising:

a longitudinal body defining at least two longitudinally extending liquid channels, the two longitudinally extending liquid channels comprising:

a first longitudinally extending liquid channel; and a second longitudinally extending liquid channel that is distinct from the first longitudinally extending liquid channel; and at least two plant holders defined in the body, the plant holders spaced on the outer circumference of the longitudinal body, each one of the at least two plant holders in fluid flow communication with a corresponding single one of the at least two longitudinally extending liquid channels; and a planting insert shaped and dimensioned to fit into mouths of the at least two plant holders, in which a first plant holder of the at least two plant holders is in fluid flow communication with the first longitudinally extending liquid channel, and in which a second plant holder of the at least two plant holders is in fluid flow communication with the second longitudinally extending liquid channel.

24. The planter of claim 23, in which the planter includes multiple planting inserts, each of the multiple planting inserts shaped and dimensioned to fit into mouths of the at least two plant holders.

25. The planter of claim 23, in which the planting insert is selected from any one or more of: a seedling tray, a planting tray and a seeding clip.

\* \* \* \* \*

UNITED STATES PATENT AND TRADEMARK OFFICE
CERTIFICATE OF CORRECTION

| | |
|---|---|
| PATENT NO. | : 10,524,434 B2 |
| APPLICATION NO. | : 16/028218 |
| DATED | : January 7, 2020 |
| INVENTOR(S) | : Eugene Van Buuren et al. |

It is certified that error appears in the above-identified patent and that said Letters Patent is hereby corrected as shown below:

On the Title Page

In item [54], please replace "HYRDOPONICS" with -- HYDROPONICS --.

Signed and Sealed this
Twenty-fifth Day of February, 2020

Andrei Iancu
*Director of the United States Patent and Trademark Office*